United States Patent
Shang et al.

(10) Patent No.: US 10,938,460 B2
(45) Date of Patent: Mar. 2, 2021

(54) COORDINATED MULTI-POINT-BASED BEAM CONFIGURATION AND MANAGEMENT METHOD

(71) Applicant: HUAWEI TECHNOLOGIES CO., LTD., Guangdong (CN)

(72) Inventors: Peng Shang, Shanghai (CN); Lu Wu, Shenzhen (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/263,984

(22) Filed: Jan. 31, 2019

(65) Prior Publication Data

US 2019/0165843 A1 May 30, 2019

Related U.S. Application Data

(63) Continuation of application No. PCT/CN2017/089007, filed on Jun. 19, 2017.

(30) Foreign Application Priority Data

Aug. 12, 2016 (CN) .......................... 201610663062.X

(51) Int. Cl.
*H04W 4/00* (2018.01)
*H04B 7/06* (2006.01)
(Continued)

(52) U.S. Cl.
CPC ......... *H04B 7/0617* (2013.01); *H04B 7/0626* (2013.01); *H04B 7/0632* (2013.01);
(Continued)

(58) Field of Classification Search
CPC .. H04B 7/0413; H04B 7/0617; H04B 7/0626; H04B 7/0632; H04B 7/0695;
(Continued)

(56) References Cited

U.S. PATENT DOCUMENTS

2010/0322176 A1 12/2010 Chen et al.
2011/0038308 A1* 2/2011 Song .................... H04B 7/0408
370/328

(Continued)

FOREIGN PATENT DOCUMENTS

CN 101931439 A 12/2010
CN 103931109 A 7/2014
(Continued)

OTHER PUBLICATIONS

Extended European Search Report issued in European Application No. 17838438.4 dated Jun. 19, 2019, 7 pages.
(Continued)

*Primary Examiner* — Minh Trang T Nguyen
(74) *Attorney, Agent, or Firm* — Fish & Richardson P.C.

(57) ABSTRACT

The present invention discloses an inter-base station beam configuration and management method, a base station, user equipment, and a system. The method includes: receiving, by user equipment, a beam signal sent by a base station; determining, by the user equipment, a receive beam based on the sent beam signal; receiving, by the base station, a beam signal sent by a terminal device; determining, by the base station, a receive beam based on the sent beam signal; performing dynamic selection and fast beam switching between base stations in combination with a coordinated multi-point technology; and performing fast beam alignment between the base station end with the user equipment end. This application can effectively implement fast beam switching and alignment between base stations and support dynamic base station selection, thereby improving link reliability.

12 Claims, 14 Drawing Sheets

(51) Int. Cl.
*H04W 72/04* (2009.01)
*H04W 16/28* (2009.01)
*H04W 24/10* (2009.01)
*H04B 7/0413* (2017.01)

(52) U.S. Cl.
CPC .......... *H04B 7/0695* (2013.01); *H04W 16/28* (2013.01); *H04W 24/10* (2013.01); *H04W 72/04* (2013.01); *H04W 72/042* (2013.01); *H04W 72/0446* (2013.01); *H04B 7/0413* (2013.01)

(58) Field of Classification Search
CPC ..... H04W 16/28; H04W 24/10; H04W 72/04; H04W 72/042; H04W 72/0446
See application file for complete search history.

(56) References Cited

U.S. PATENT DOCUMENTS

| | | | |
|---|---|---|---|
| 2012/0157140 A1* | 6/2012 | Kim | H04B 7/024 455/501 |
| 2013/0065622 A1 | 3/2013 | Hwang et al. | |
| 2013/0286960 A1 | 10/2013 | Li et al. | |
| 2014/0073337 A1* | 3/2014 | Hong | H04W 16/28 455/452.1 |
| 2015/0131750 A1 | 5/2015 | Xue et al. | |
| 2015/0257073 A1 | 9/2015 | Park et al. | |
| 2016/0365900 A1* | 12/2016 | Kim | H04B 7/0408 |
| 2017/0215117 A1* | 7/2017 | Kwon | H04B 7/04 |
| 2019/0081672 A1* | 3/2019 | Hwang | H04B 7/0413 |

FOREIGN PATENT DOCUMENTS

| | | |
|---|---|---|
| CN | 104618964 A | 5/2015 |
| CN | 104620551 A | 5/2015 |
| WO | 2011014014 A2 | 2/2011 |

OTHER PUBLICATIONS

R1-165564 Nokia et al., "WF on UE beamforming and beam management",3GPP TSG RAN WG1 Meeting #85 , Nanjing, China, May 23-28, 2016,total 6 pages.

International Search Report and Written Opinion issued in International Application No. PCT/CN2017/089007 dated Jul. 28, 2017, 19 pages.

EPO Communication under Rule 71(3) EPC issued in European Application No. 17838438.4 dated Mar. 25, 2020,.

MediaTek Inc., "Mobility Supporting for HF-NR," 3GPP TSG-RAN WG2 #94, R2-163484 , Nanjing, China, May 23-27, 2016, 6 pages.

Office Action issued in Chinese Application No. 201610663062.X dated May 20, 2020, 10 pages (with English translation).

Samsung, "Discussion on Beam Measurement and Tracking for 5G New Radio Interface in mmWave Frequency Bands," 3GPP TSG RAN WG2 #93bis, R2-162226, Dubrovnik, Croatia, Apr. 11-15, 2016, 5 pages.

Samsung, "Use cases and RAN2 issues of beam tracking in a beamforming based high frequency NR," 3GPP TSG-RAN WG2 Meeting #94, R2-163730, Nanjing, China, May 23-27, 2016, 5 pages.

* cited by examiner

COORDINATED MULTI-POINT-BASED BEAM CONFIGURATION AND MANAGEMENT METHOD

CROSS-REFERENCE TO RELATED APPLICATIONS

This application is a continuation of International Application No. PCT/CN2017/089007, filed on Jun. 19, 2017, which claims priority to Chinese Patent Application No. 201610663062.X, filed on Aug. 12, 2016. The disclosures of the aforementioned applications are hereby incorporated by reference in their entireties.

TECHNICAL FIELD

The present invention relates to the communications field, and more specifically, to an inter-base station beam configuration and management method, a base station, user equipment, and a system.

BACKGROUND

Emergence of a multiple input multiple output (Multiple Input Multiple Output, MIMO) technology brings significant changes to wireless communication. By configuring a plurality of antennas on both a transmit end device and a receive end device, the MIMO technology can provide a plurality of channels that are independent of each other, and therefore a data transmission rate is multiplied. Currently, a next-generation evolved system has higher requirements on network performance and user experience, bringing greater challenges to a 5G system and facilitating various new technologies to appear. Among the technologies, a massive MIMO technology is the most potential one whose spectral efficiency is improved by multiples and power consumption is reduced by configuring a large quantity of antennas (100-1000) at an end portion of a base station, thereby improving link quality and improving cell coverage. Because a future 5G system requires low latency, high energy efficiency, high cost efficiency, and high spectral efficiency, costs of a large-scale antenna array are increased as a quantity of the antennas is increased. A base station (BS) of a massive MIMO system usually uses a hybrid precoding technology in which an analog precoding technology and a digital precoding technology are combined, can reduce a quantity of radio frequency channels to be much smaller than the quantity of the antennas, and can more effectively reduce the costs of the large-scale antenna array and fully use degrees of freedom that are provided by all the antennas. Similarly, user equipment (UE) can also use an analog precoding, a digital precoding, or a hybrid precoding scheme. To ensure that an antenna array gain is obtained, a beam at a BS end needs to be aligned with a beam at a UE end, to ensure cell coverage and link quality. Particularly, for a narrow beamforming technology, a selection error of a beam direction may obviously decrease an SINR.

Coordinated multi-point (Coordinated Multi-Point, CoMP) technologies have been widely discussed in a conventional MIMO system, and theoretically can significantly improve a capacity, particularly for border users. Existing coordinated multi-cell technologies based on the conventional MIMO system mainly can be classified into two categories: joint processing (Joint Processing, JP), and dynamic multi-point selection (Dynamic Point Selection, DPS) and coordinated scheduling/coordinated beamforming (Coordinated Scheduling/Coordinated Beamforming, CS/CB). A downlink technology corresponding to the joint processing is joint transmission (Joint Transmission, JT), and an uplink technology corresponding to the joint processing is joint reception (Joint Reception, JR). The three schemes are all widely paid attention to and are discussed in depth in 3GPP LTE-A R11. Each of the three schemes has advantages and disadvantages. For downlink, a JT scheme allows a plurality of base stations to jointly send data to one or more users. The plurality of base stations can cooperate in a multi-user joint precoding or a single-user precoding manner. This scheme can obtain a maximum capacity gain in all cell coordination schemes, but also has highest requirements on a system. JT not only requires the coordinating base stations to share channel and data information of all users, but also requires the base stations to be strictly synchronized. This causes great pressure to both a backhaul network and the system. In the CS/CB scheme, each base station merely serves users of a cell to which the base station belongs, but interference avoidance/zeroization to users in an adjacent cell is considered in a scheduling/precoding process of the users. This coordination manner has much lower requirements on the system than JT. CS/CB does not require the coordinating base stations to exchange the channel and data information of the users with each other and has much lower requirements on synchronization of the base stations, and therefore, basically causes no extra load to the backhaul network. However, this scheme has deficiencies of a limited gain and being less advantageous in terms of capacity as compared with the JT scheme. In a DPS scheme, on each time-frequency resource block, during each transmission, one base station is selected from a CoMP coordinating set of the base station to transmit data. Algorithm complexity is low, and a performance gain is relatively limited.

In the massive MIMO system, beams become narrower as the quantity of the antennas is increased. Therefore, the interference avoidance/zeroization function of CS/CB is enhanced in a large-capacity MIMO system, and coordinated scheduling and beamforming may become simpler and more easily to implement. Therefore, for the massive MIMO system, when UE moves or rotates or beams are blocked, to enable a link to reply quickly, an effective inter-base station beam configuration and management scheme needs to be researched in combination with the precoding technology and the CoMP technology.

SUMMARY

A technical problem to be resolved by embodiments of this application is to provide an inter-base station beam configuration and management method based on a coordinated multi-point technology, a base station, a terminal device, and a system, to implement dynamic beam alignment between the base station and the terminal device, and support dynamic base station selection and fast beam switching between coordinated base stations, thereby ensuring link reliability.

The present invention mainly includes beam management schemes in four scenarios. The beam management schemes are:

an inter-base station beam management scheme in a downlink independent network system;

an inter-base station beam management scheme in a downlink dependent network system;

an inter-base station beam management scheme in an uplink independent network system; and an inter-base station beam management scheme in an uplink dependent network system.

To complete measurements of a plurality of beams, the plurality of beams may be measured at the same time or may be measured at different times. For downlink, each base station in a terminal device coordinating set sends a plurality of beams for measurement. The terminal device maintains a beam pair set after the measurement, and a quantity of beam pairs is configurable. Each base station also maintains a beam pair set after the beam measurement, and each beam pair includes a transmit beam resource index and a receive beam index of the terminal device that are fed back by the terminal device.

For uplink, the terminal device sends a plurality of beams. Each base station in the terminal device coordinating set measures the plurality of beams of the terminal device, maintains a beam pair set, and sends a measurement result to the terminal device by using DCI. The terminal device also maintains a beam pair set.

In a possible design, beam switching is triggered in an $n^{th}$ subframe, and switching can also be performed in an $(n+k)^{th}$ subframe. The base station can dynamically indicate beam switching by using a downlink control information (Downlink Control Information, DCI) message or semi-statically indicate beam switching by using higher layer signaling. To be specific, k may be semi-statically or dynamically configured.

In a possible design, for downlink, the base station sends a reference signal for the beam measurement to the terminal device. The reference signal may be a CSI-RS (Channel State Information-Reference Signal), a DMRS (Demodulation Reference Signal), or a new reference signal specified for the beam measurement.

In a possible design, for uplink, the terminal device sends a reference signal for the beam measurement to the base station. The reference signal may be an SRS (Sounding Reference Signal), a DMRS (Demodulation Reference Signal), or a new reference signal specified for the beam measurement.

DESCRIPTION OF EMBODIMENTS

The following describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

With constant theoretical and practical development of communication, more wireless communications technologies start to appear and gradually become mature. The wireless communications technologies include, but are not limited to, a Time Division Multiple Access (Time Division Multiple Access, TDMA) technology, a Frequency Division Multiple Access (Frequency Division Multiple Access, FDMA) technology, a Code Division Multiple Access (Code Division Multiple Access, CDMA) technology, a Time Division-Synchronous Code Division Multiple Access (Time Division-Synchronous Code Division Multiple Access, TD-SCDMA), an orthogonal FDMA (Orthogonal FDMA, OFDMA) technology, a single carrier FDMA (Single Carrier FDMA, SC-FDMA) technology, a space division multiple access (Space Division Multiple Access, SDMA) technology, and evolved technologies of these technologies. The wireless communications technologies are used in various wireless communications standards as radio access technologies (Radio Access Technology, RAT). Therefore, various wireless communications systems well known by people today are constructed, including but not limited to, a Global System For Mobile Communications (Global System for Mobile Communications, GSM), CDMA 2000, wideband CDMA (Wideband CDMA, WCDMA), Wi-Fi defined in the 802.11 series standard, Worldwide Interoperability for Microwave Access (Worldwide Interoperability for Microwave Access, WiMAX), Long Term Evolution (Long Term Evolution, LTE), LTE-Advanced (LTE-Advanced, LTE-A), and evolved systems of these wireless communications systems. Unless particularly noted, the technical solutions provided in the embodiments of this application can be applied to all the foregoing wireless communications technologies and wireless communications system. In addition, terms "system" and "network" can be interchanged with each other.

Figure 1:
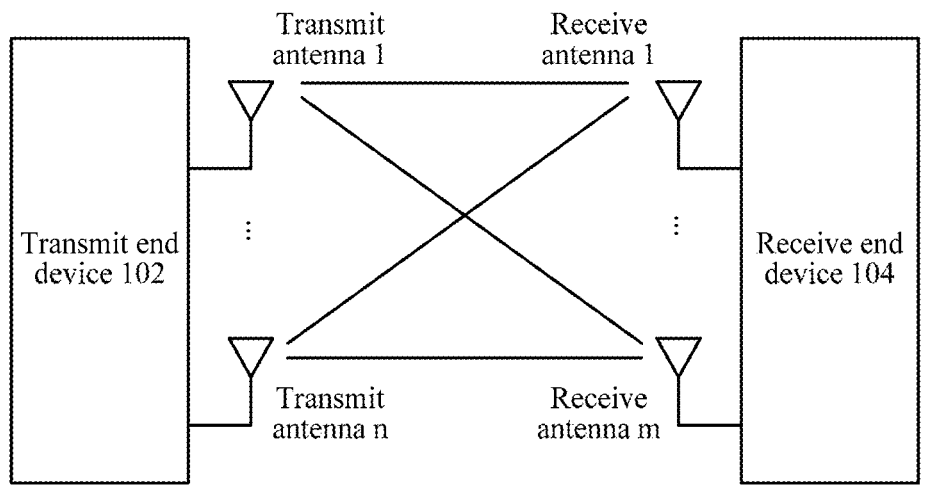
FIG. 1 is a schematic diagram of an application scenario of MIMO.

FIG. 1 is a schematic diagram of an application scenario of MIMO. The application scenario shown in FIG. 1 includes a transmit end device 102 and a receive end device 104. The transmit end device 102 may be, for example but not limited to a base station. The receive end device 104 may be, for example but not limited to a terminal device. n(n>1) transmit antennas specifically presented as transmit antennas 1-*n* are configured on the transmit end device 102. m(m>1) receive antennas specifically presented as receive antennas 1-*m* are configured on the receive end device 104. In this way, a total of m×n channels exist between the foregoing n transmit antennas and m receive antennas. The channels are shown by solid lines between the transmit antennas 1-*n* and the receive antennas 1-*m* (where some of the channels are not shown).

In an ideal situation (for example, not considering noise), the foregoing m×n channels can be presented by using the following channel matrix:

$$H = \begin{bmatrix} h_{11} & \cdots & h_{1n} \\ \vdots & \ddots & \vdots \\ h_{m1} & \cdots & h_{mn} \end{bmatrix}$$

$h_{ij}$ (1≤i≤m, 1≤j≤n) presents a channel gain between a transmit antenna j and a receive antenna i. The receive end device 104 can determine the foregoing channel matrix by using a pilot (Pilot) transmitted by the transmit end device 102. The pilot may also be referred to as a reference signal.

Figure 2:
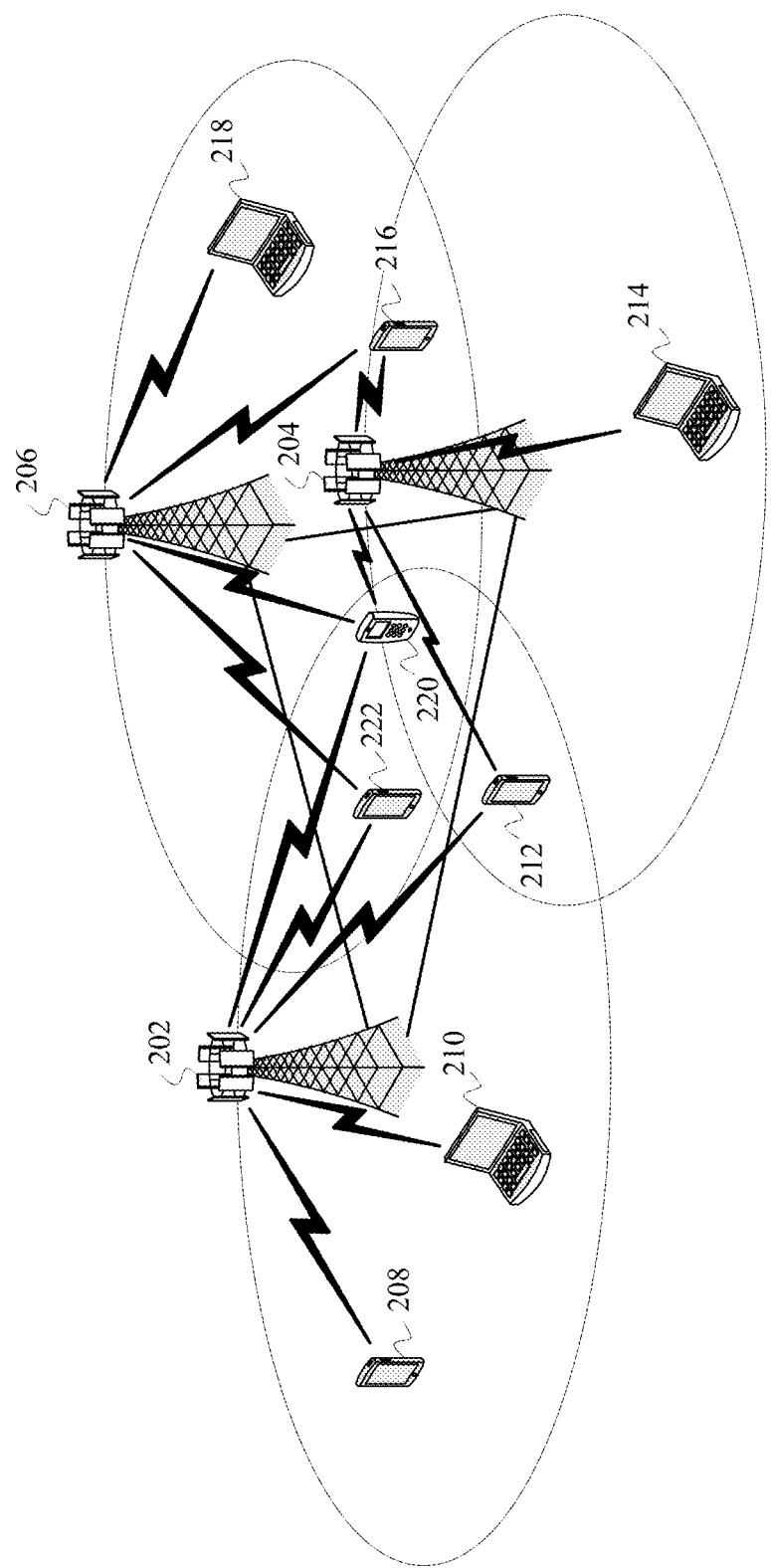
FIG. 2 is a schematic diagram of an example of a wireless communications network according to an embodiment of the present invention.

FIG. 2 is a schematic diagram of an example of a wireless communications network 200 according to an embodiment of this application. As shown in FIG. 2, the wireless communications network 200 includes base stations 202-206 and terminal devices 208-222. The base stations 202-206 may communicate with each other by using a backhaul (backhaul) link. Straight lines between the base stations 202-206 show the backhaul link. The backhaul link may be a wired backhaul link (for example, an optical fiber or a copper cable), or may be a wireless backhaul link (for example, a microwave). The terminal devices 208-222 may communicate with the base stations 202-206 by using a radio link. Fold lines between the base stations 302-206 and the terminal devices 208-222 shows the radio link.

The base stations 202-206 are configured to provide wireless access services to the terminal devices 208-218. Specifically, each base station provides a service coverage area (also referred to as cellular). Service coverage areas are shown by using elliptic areas in FIG. 2. A terminal device entering the area may communicate with the base station by using a radio signal, to receive the wireless access service provided by the base station. The service coverage areas of the base stations may overlap, and the terminal device in an overlapping area may receive radio signals from a plurality of the base stations. For example, as shown in FIG. 2, the service coverage area of the base station 202 overlaps that of the base station 204, and the terminal device 212 is located in the overlapping area. Therefore, the base station 202 and the base station 204 can together provide services to the terminal device 212 by using CoMP technologies, including uplink CoMP and downlink CoMP. For another example, as shown in FIG. 2, the service coverage areas of the base station 202-206 have a common overlapping area, and the terminal device 220 is located in the overlapping area. Therefore, the base station 202-206 can together provide services to the terminal device 220 by using the CoMP technologies. The CoMP technologies may be JP, DPS, CS/CB, and the like.

Depending on the used wireless communications technologies, the base station may also be referred to as a NodeB (NodeB), an evolved NodeB (evolved NodeB, eNodeB), an access point (Access Point, AP), a transmission and reception point (Transmission and Reception Point, TRP), or the like. In addition, based on sizes of provided service coverage areas, the base stations may be further divided into macro base stations used for providing macro cells (Macro cells), micro base stations used for providing pico cells (Pico cells), and femto base stations used for providing femto cells (Femto cells). With continuous evolution of the wireless communications technologies, a future base station may also use another name.

The terminal devices 208-218 may be various wireless communications devices having wireless communications functions. The terminal devices are, for example but not limited to, a mobile cellular phone, a cordless phone, a personal digital assistant (Personal Digital Assistant, PDA), a smartphone, a notebook computer, a tablet computer, a wireless data card, a wireless modem (modulator demodulator modem), or a wearable device such as a smartwatch. With emergence of Internet of Things (Internet of Things, IoT) technologies, more devices that previously do not have communications functions, for example but not limited to, household appliances, vehicles, tool devices, service devices, and service facilities, are provided with wireless communications units and start to obtain wireless communications functions, to access the wireless communications network and to implement remote control. Such devices are provided with the wireless communications units and have the wireless communications functions, and therefore also belong to a scope of wireless communications devices. In addition, the terminal devices 208-218 may also be referred to as mobile stations, mobile devices, mobile terminals, wireless terminals, handheld devices, clients, or the like.

The base stations 202-206 and the terminal devices 208-222 may all be configured with a plurality of antennas, to support an MIMO technology, particularly a massive MIMO technology. In addition, the base stations 202-206 and the terminal devices 204-210 may communicate by using various wireless communications technologies, for example but not limited to the wireless communications technologies described above.

It should be noted that the wireless communications network 200 shown in FIG. 2 is merely an example, and is not intended to limit the technical solutions of this application. A person skilled in the art should understand that in a specific implementation process, the wireless communications network 200 further includes other devices, for example but not limited to a base station controller (Base Station Controller, BSC). The base station and the terminal device may also be configured according to specific requirements.

Figure 3:
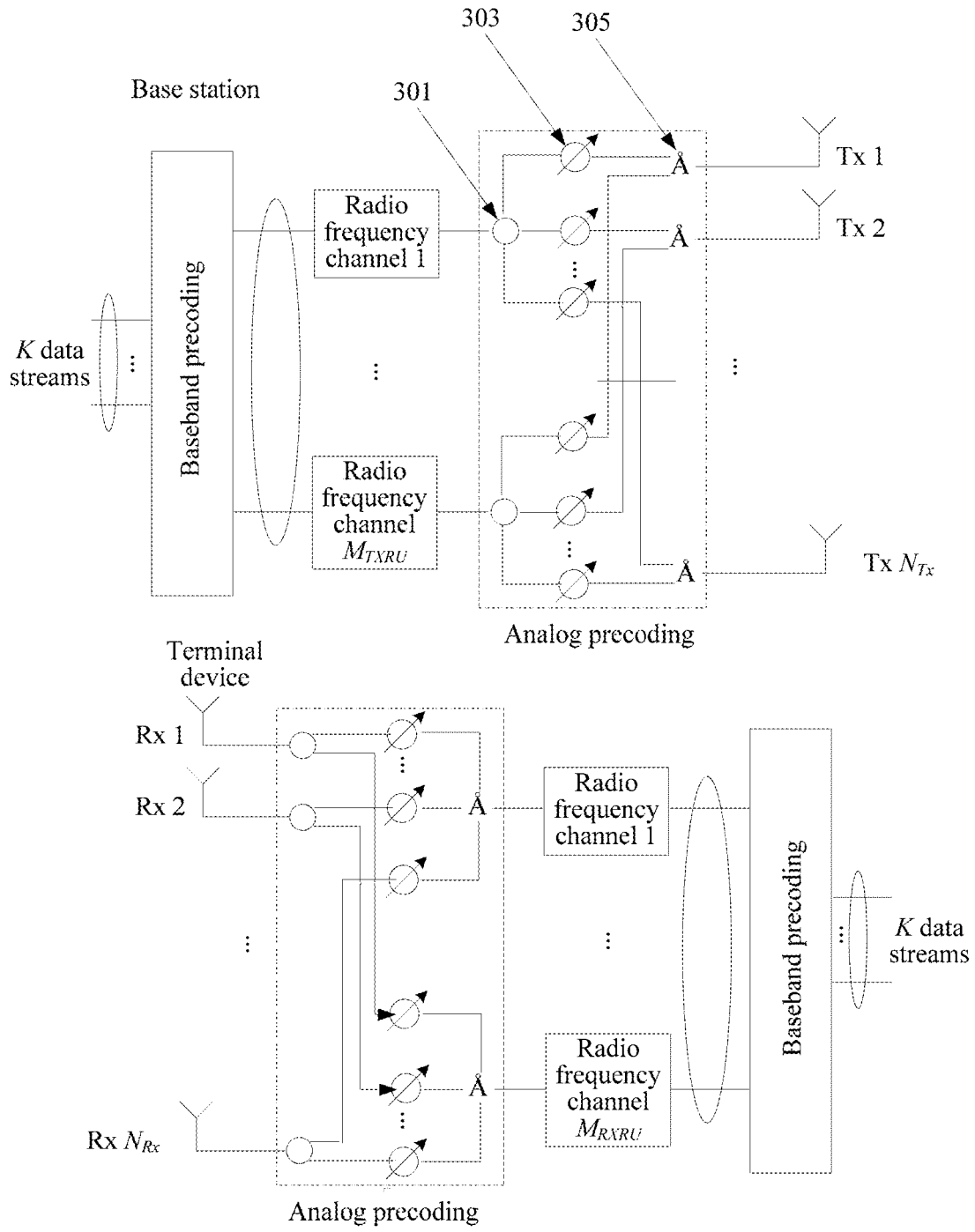
FIG. 3 is a schematic diagram in which a base station and a terminal device both use hybrid precoding.

FIG. 3 is a schematic diagram in which a downlink base station and a terminal device both use hybrid precoding.

As shown in FIG. 3, during data transmission, for downlink, an output of baseband precoding at a base station end is coupled to an input of a radio frequency channel. An output of the radio frequency channel is coupled to an input of analog precoding. An output of the analog precoding is coupled to an antenna. The base station forms different transmit beams through the analog precoding. An output of an antenna of the terminal device is coupled to the input of the analog precoding. The output of the analog precoding is coupled to the input of the radio frequency channel. The output of the radio frequency channel is coupled to the baseband precoding. The terminal device forms different receive beams through the analog precoding. For uplink, the foregoing process is exactly on the contrary.

The analog precoding shown in FIG. 3 implements beamforming on an analog signal, and achieves different weights by changing a phase of the signal by using a phase-shift network technology. In an implementation, first level precoding may be implemented by using a phase-shift network. The phase-shift network may include a plurality of taps 301, a plurality of phase shifters 303, and a plurality of combiners 305. In FIG. 2, each radio frequency channel is connected to all antennas by using the first level precoding, and a signal sent by each antenna is a weighted sum of data from all radio frequency channels. Therefore, the structure shown in FIG. 3 may also be referred to as a fully-connected structure.

Figure 4:
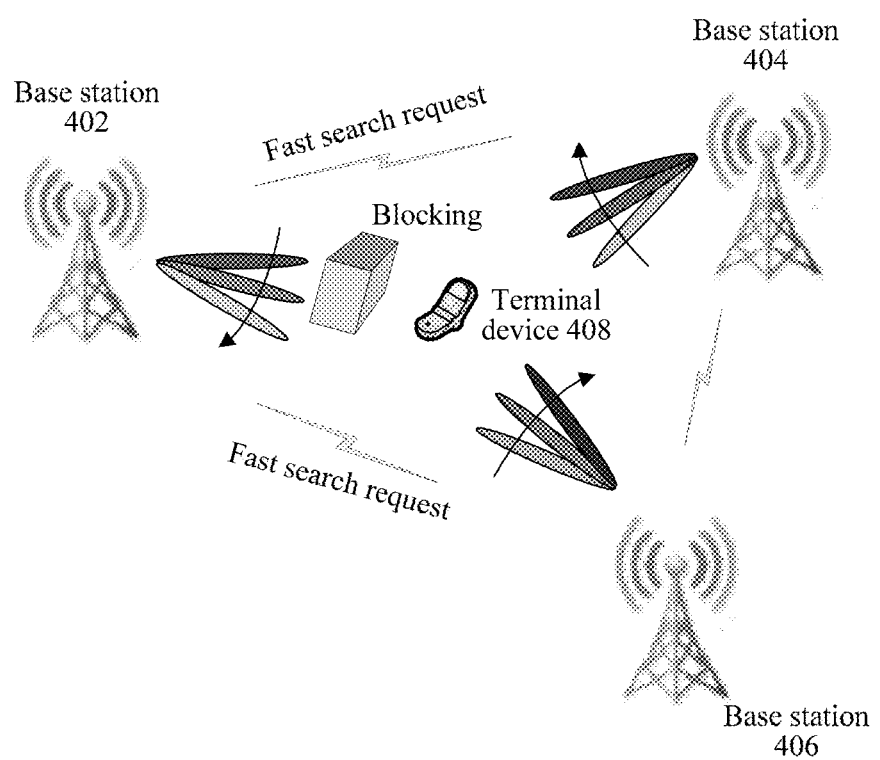
FIG. 4 is a schematic diagram of a situation of beam switching according to this application.

FIG. 4 is a schematic diagram of a situation of beam switching according to this application.

As shown in FIG. 4, 402-406 represent base stations, and 408 represents a terminal device. The terminal device 408 sets up a connection and a service with the base station 408. A beam of the terminal device 408 is aligned with a beam of the base station 402, and a signal is good. At a certain time, due to a movement or a rotation of the terminal device 408, an object blocks between the terminal device 408 and the base station 402, and a link is interrupted or becomes worse. In this case, the base station 402 may select to send a fast search request to other base stations in a terminal device coordinating set by using a base station controller. The terminal device 408 may be served by the base station 404 or the base station 406, to implement fast beam switching between the base stations and fast recovery of the link.

Figure 5:
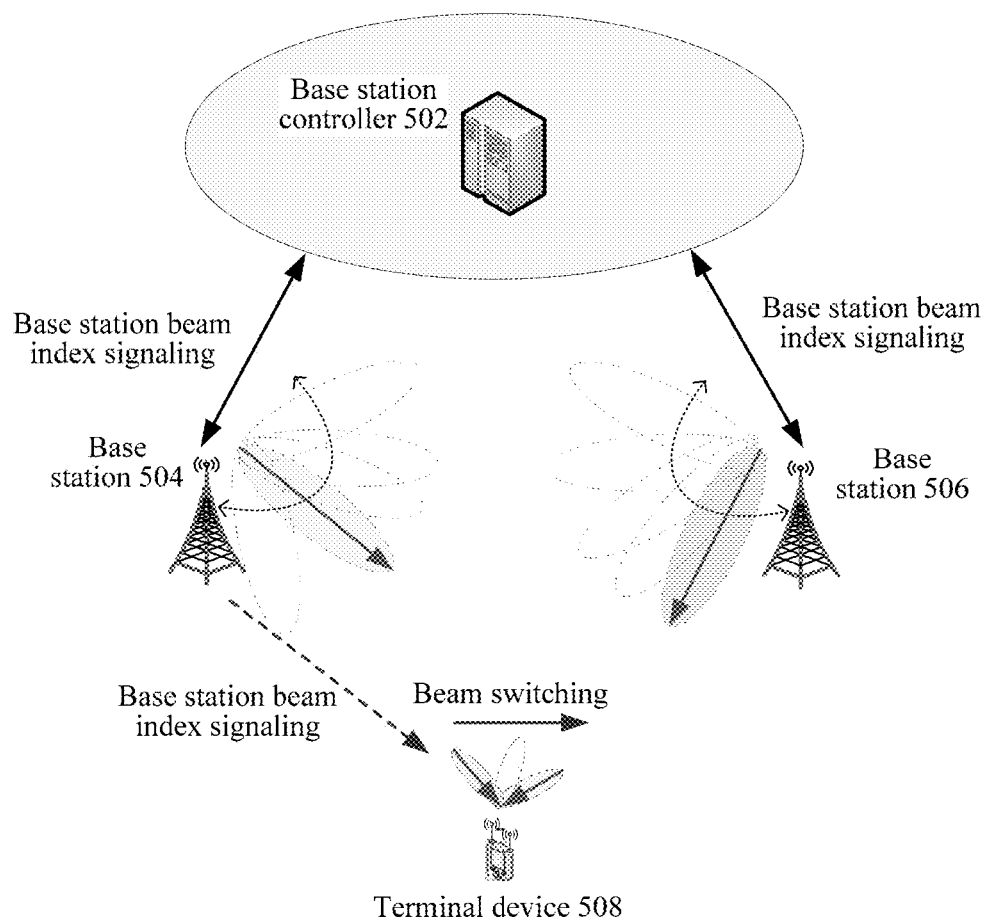
FIG. 5 is a schematic diagram of beam switching in a downlink independent network system according to an embodiment of this application.

FIG. 5 is a schematic diagram of beam switching in a downlink independent network system according to an embodiment of this application. As shown in FIG. 5, a base station controller 502, base stations 504 and 506, and a terminal device 508 are mainly included. The base stations 504 and 506 form a CoMP coordinating set of the terminal device 508, and both the base stations 504 and 506 are connected to the base station controller 502.

At an $n^{th}$ subframe, when the terminal device 508 needs to be handed over from the base station 504 to the base station 506 due to a movement or a rotation and beam blocking, the base station controller 502 at an upper layer may indicate, by sending a DCI message by using the base station 504 or the base station 506, a transmit beam index of the base station to which the terminal device 508 switches. The terminal device 508 selects a receive beam from a beam set of the terminal device 508 based on the received transmit beam index of the base station, and switches to a corresponding optimal receive beam in an $(n+k)^{th}$ subframe. Therefore, an optimal transmit and receive beam pair is determined by the terminal device 508 and fed back to the base station. The terminal device 508 knows optimal receive beams that should be used by all transmit beams, but does not know from which base station in the CoMP set the transmit beam specifically comes.

Figure 6:
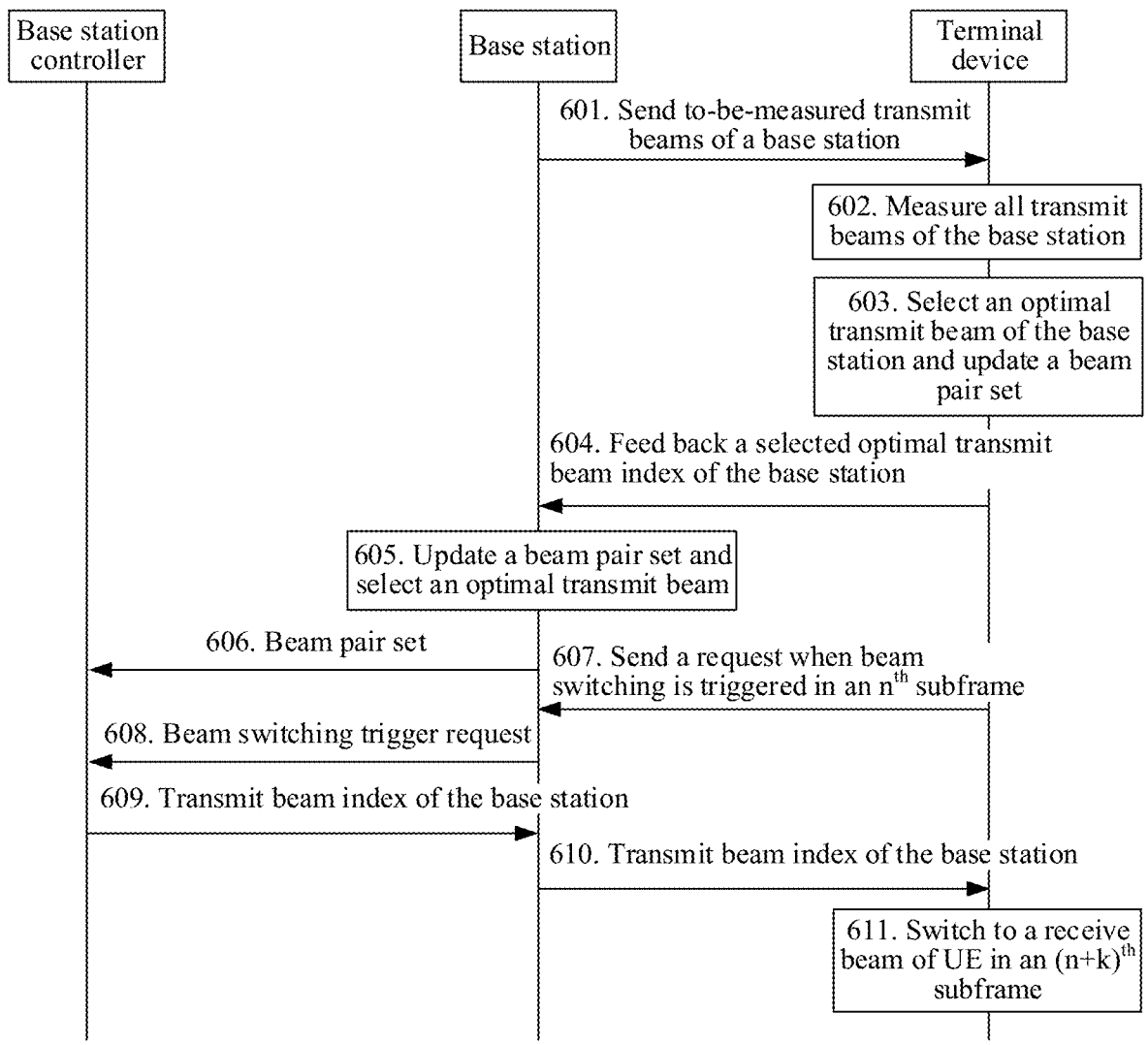
FIG. 6 is a schematic interaction diagram of a method for a beam switching process in a downlink independent network system according to an embodiment of this application.

FIG. 6 is a schematic interaction diagram of a method for a beam switching process in a downlink independent network system according to an embodiment of this application. As shown in FIG. 6, the method includes the following steps:

601. A terminal device sends a reference signal used for beam measurement to each base station in a CoMP coordinating set, where the reference signal may be a CSI-RS, or a DMRS, or a new reference signal specified for the beam measurement.

602. The terminal device measures all beams sent from coordinating base stations.

603. The terminal device determines, based on different powers received by different beams, a beam corresponding to a group of reference signals that has maximum receive power, selects an optimal transmit beam of the base station and an optimal receive beam of the terminal device, and updates a maintained beam pair set. Each beam pair includes a transmit beam index of the base station and a receive beam index of the terminal device. The transmit beam index of the base station may be a beam identification index or a reference signal resource index.

604. The terminal device feeds back to each base station in the CoMP coordinating set, the optimal transmit beam index of the base station and the optimal receive beam index that are selected by the terminal device.

605. The base station receives beam information fed back by a user, updates a beam pair set maintained by the base station, where each beam pair includes a transmit beam resource index and the receive beam index of the terminal device that are fed back by the terminal device, and selects an optimal transmit beam to serve the terminal device.

606. The base station subsequently sends information about the beam pair set of the base station to a base station controller at an upper layer, to support dynamic fast selection of the base station and fast beam switching.

607. When beam switching is triggered in an $n^{th}$ subframe, the terminal device sends a request to the base station.

608. The base station forwards the beam switching request to the base station controller.

609. The base station controller sends a current optimal transmit beam index of the base station to the base station based on measurement information.

610. The base station forwards the received optimal transmit beam index to a device terminal.

611. After receiving the optimal transmit beam index, the terminal device selects a corresponding optimal receive beam from a beam pair maintained by the terminal device, and switches the beams in an $(n+k)^{th}$ subframe based on k that is semi-statically or dynamically configured before.

Figure 7:
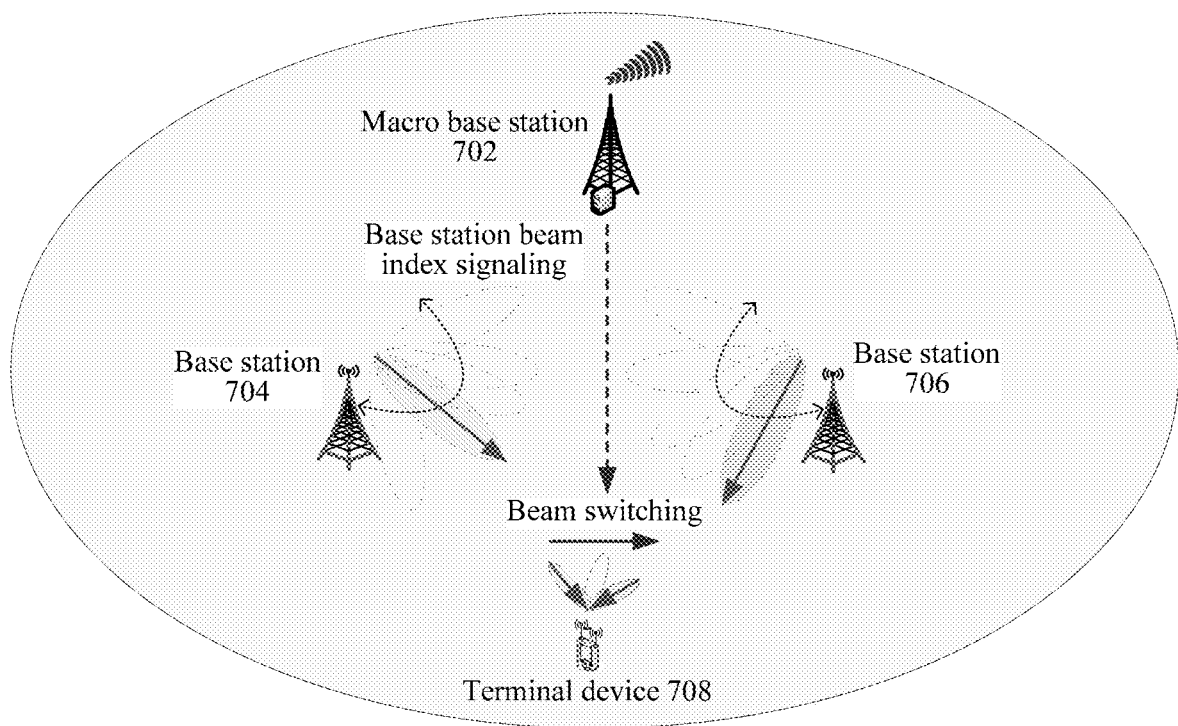
FIG. 7 is a schematic diagram of beam switching in a downlink dependent network system according to another embodiment of this application.

FIG. 7 is a schematic diagram of beam switching in a downlink dependent network system according to another embodiment of this application. As shown in FIG. 7, a macro base station 702, base stations 704 and 706, and a terminal device 708 are mainly included. The base stations 704 and 706 form a CoMP coordinating set of the terminal device 708, and both the base stations 704 and 706 are connected to the macro base station 702. Each UE has dual connectivity. A control plane is separated from a data plane. The base stations 704 and 706 are responsible for the data plane. The macro base station 702 is responsible for the control plane, obtains a measurement report, and instructs beam switching. In an $n^{th}$ subframe, when the terminal device 708 needs to be handed over from the base station 704 to the base station 706 due to a movement or a rotation and beam blocking, the macro base station 702 sends a DCI message to indicate a transmit beam index of the base station to which the terminal device 708 switches. The terminal device 708 selects a receive beam from a beam set of the terminal device 708 based on the received transmit beam index of the base station, and switches to a corresponding optimal receive beam in an $(n+k)^{th}$ subframe. Therefore, an optimal transmit and receive beam pair is determined by the UE and fed back to a base station side. The terminal device 708 knows optimal receive beams that should be used by all transmit beams, but does not know from which base station in the CoMP set the transmit beam specifically comes.

Figure 8:
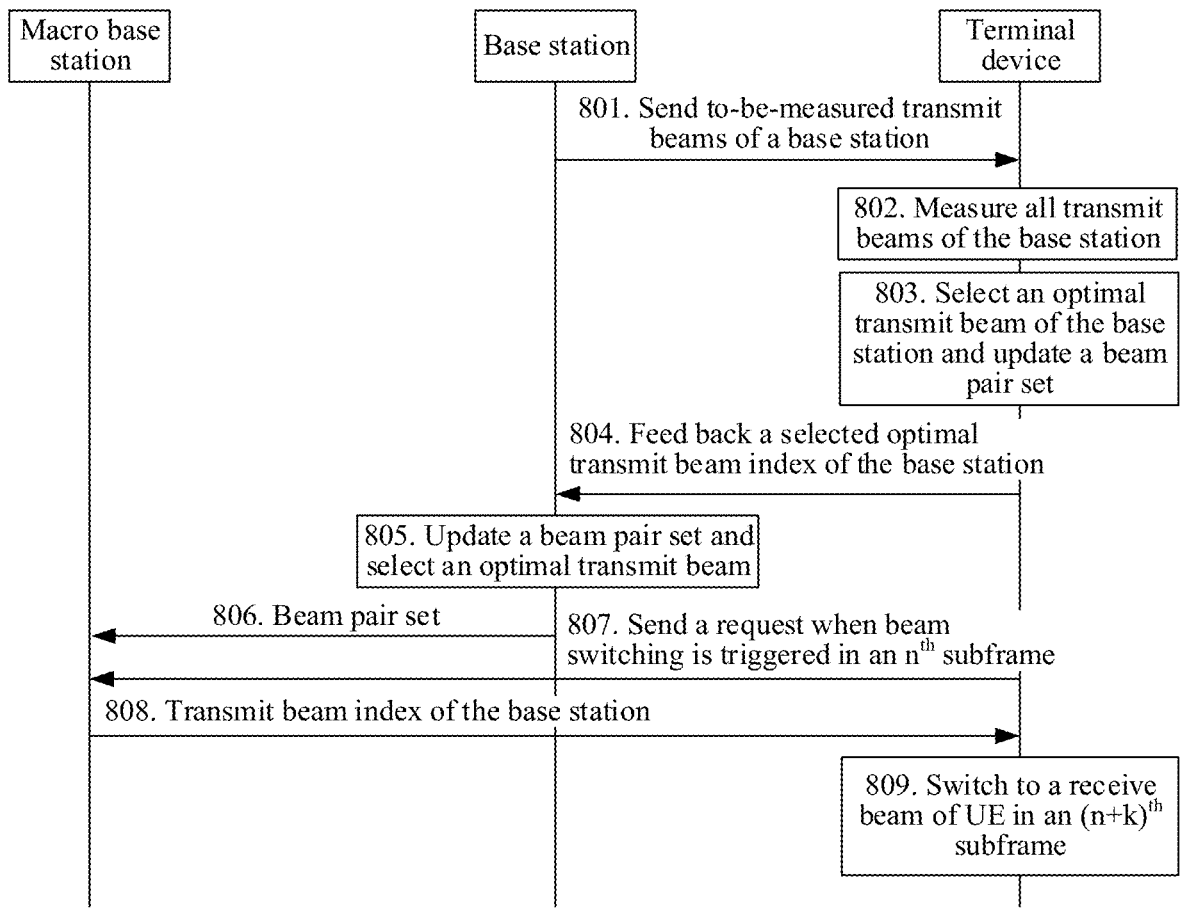
FIG. 8 is a schematic interaction diagram of a method for a beam switching process in a downlink dependent network system according to another embodiment of this application.

FIG. 8 is a schematic interaction diagram of a method for a beam switching process in a downlink dependent network system according to an embodiment of this application. As shown in FIG. 8, the method includes the following steps:

801 to 806 are basically the same as 601 to 606, and a difference is that the base station controller is replaced with a macro base station.

807. When beam switching is triggered in an $n^{th}$ subframe, the terminal device sends a request to the macro base station.

808. A macro base station controller sends an optimal transmit beam index of the terminal device to the terminal device based on current information.

809. After receiving the optimal transmit beam index sent by the macro base station, the terminal device selects a corresponding optimal receive beam from a beam pair maintained by the terminal device, and switches the beams in an $(n+k)^{th}$ subframe based on k that is semi-statically or dynamically configured before.

Figure 9:
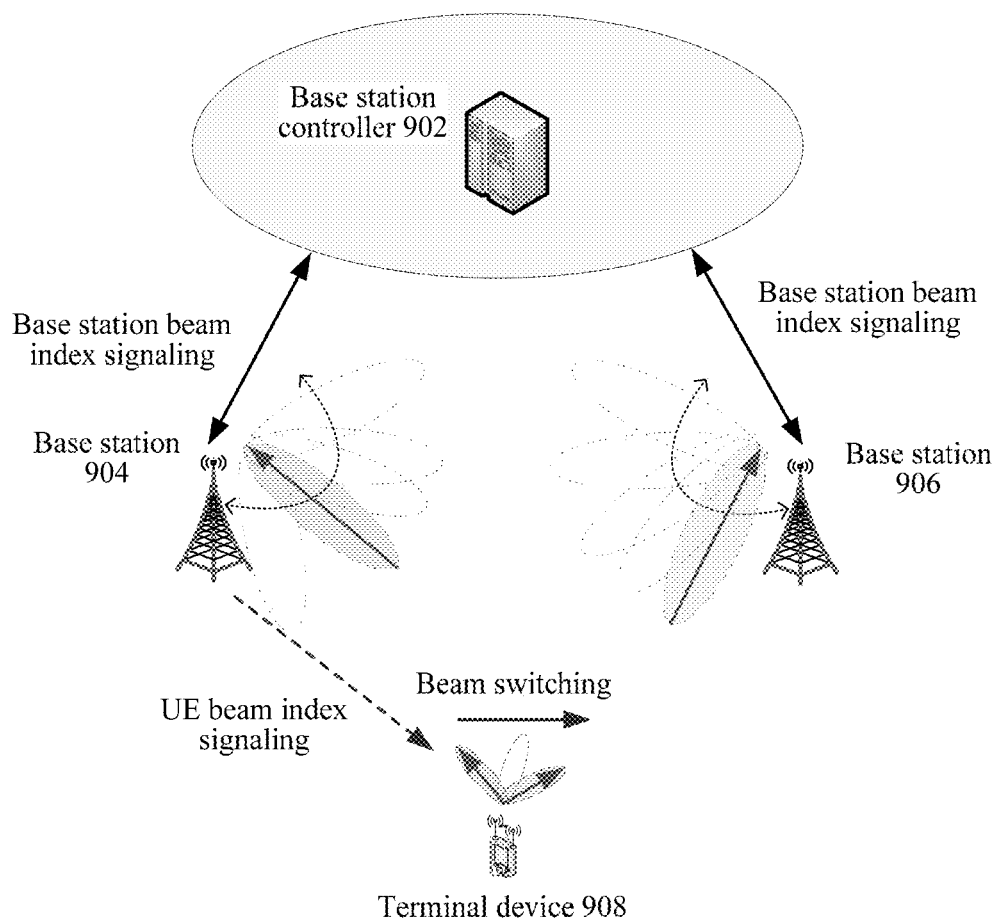
FIG. 9 is a schematic diagram of beam switching in an uplink independent network system according to an embodiment of this application.

FIG. 9 is a schematic diagram of beam switching in an uplink independent network system according to another embodiment of this application. As shown in FIG. 5, a base station controller 902, base stations 904 and 906, and a terminal device 908 are mainly included. The base stations 904 and 906 form a CoMP coordinating set of the terminal device 908, and both the base stations 904 and 906 are connected to the base station controller 902.

In an $n^{th}$ subframe, when the terminal device 908 needs to be handed over from the base station 904 to the base station 906 due to a movement or a rotation and beam blocking, the base station controller 902 at an upper layer may indicate, by sending a DCI message by using the base station 904 or the base station 906, an optimal receive beam index to which the terminal device 908 switches. The terminal device 508 switches to a received optimal transmit beam in an $(n+k)^{th}$ subframe. Therefore, an optimal transmit and receive beam pair is determined by the base station controller 902.

Figure 10:
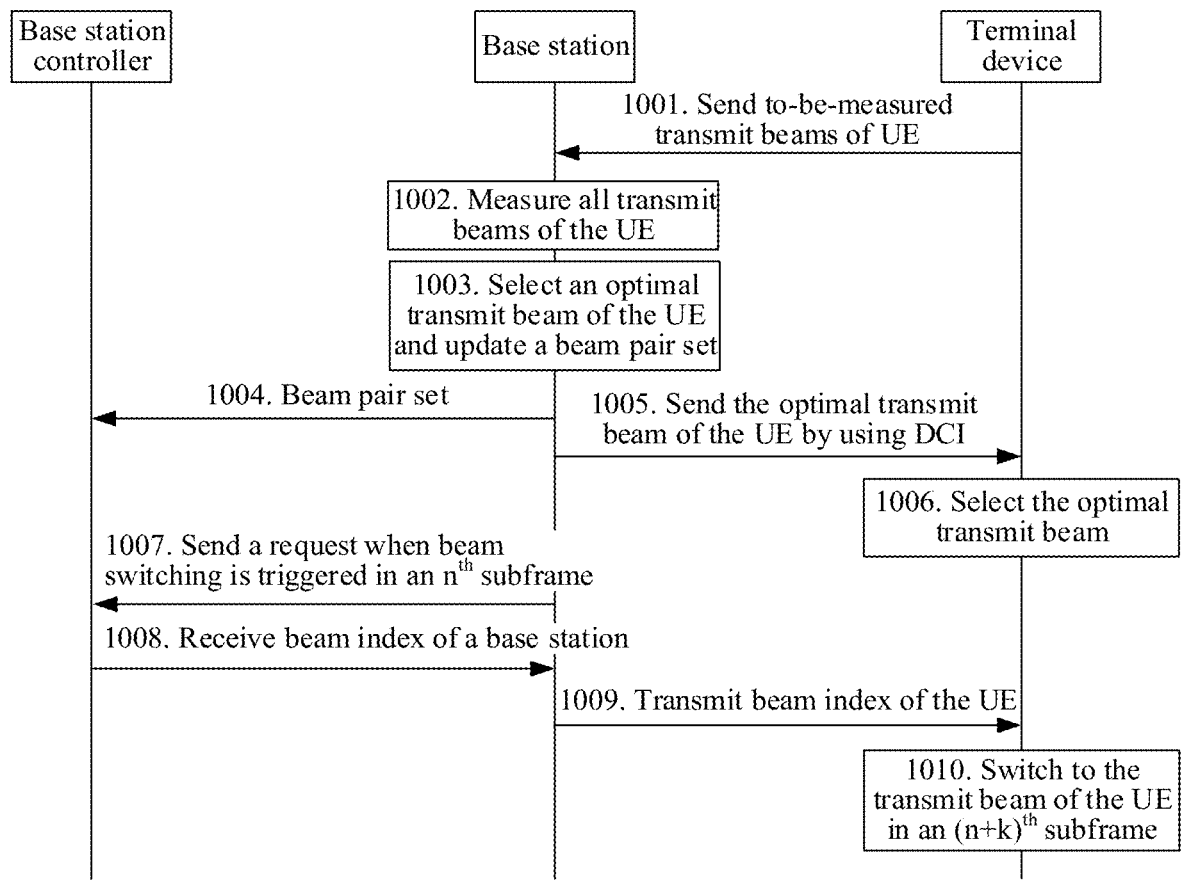
FIG. 10 is a schematic interaction diagram of a method for a beam switching process in an uplink independent network system according to another embodiment of this application.

FIG. 10 is a schematic interaction diagram of a method for a beam switching process in an uplink independent network system according to an embodiment of this application. As shown in FIG. 10, the method includes the following steps:

1001. A terminal device sends a reference signal used for beam measurement to each base station in a CoMP coordinating set, where the reference signal may be an SRS, or a DMRS, or a new reference signal specified for the beam measurement.

1002. Each base station in the CoMP coordinating set measures a beam sent by the terminal device.

1003. The base station determines, based on different powers received by different beams, a beam corresponding to a group of reference signals that has maximum receive power, selects an optimal transmit beam and an optimal receive beam, and updates a maintained beam pair set. Each beam pair includes a transmit beam index of the terminal device and a receive beam index of the base station. The transmit beam index of the terminal device may be a beam identification index or a reference signal resource index.

1004. The base station sends information about the beam pair set maintained by the base station to a base station controller.

1005. The base station sends an optimal transmit beam index of the base station to the terminal device by using DCI.

1006. The terminal device switches to the optimal transmit beam index received from the base station.

1007. When beam switching is triggered in an $n^{th}$ subframe, the base station sends a request to the base station controller.

1008. The base station controller sends an optimal receive beam index of the base station to the base station based on current information.

1009. The base station finds an optimal transmit beam index corresponding to the terminal device from the beam pair set based on the received optimal receive beam index, and sends the optimal transmit beam index of the terminal device to the terminal device.

1010. After receiving the optimal transmit beam index, the terminal device switches the beams in an $(n+k)^{th}$ subframe based on k that is semi-statically or dynamically configured before.

Figure 11:
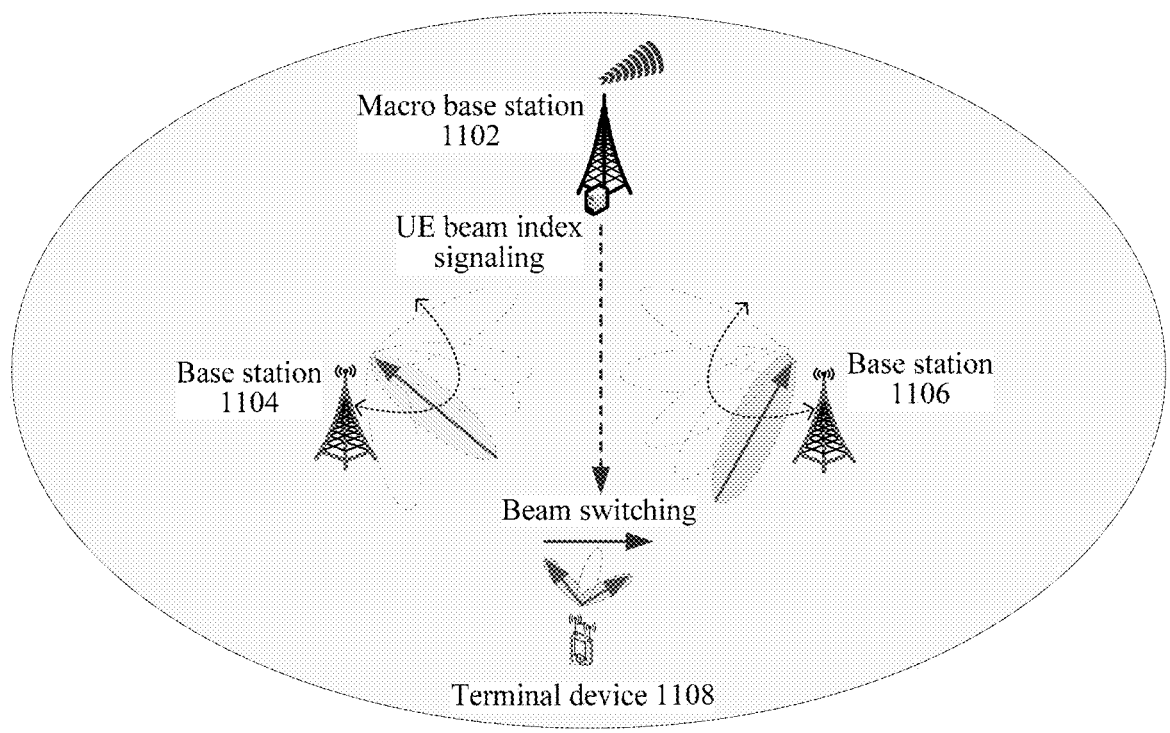
FIG. 11 is a schematic diagram of beam switching in an uplink dependent network system according to another embodiment of this application.

FIG. 11 is a schematic diagram of beam switching in an uplink dependent network system according to another embodiment of this application. As shown in FIG. 7, a macro base station 1102, base stations 1104 and 1106, and a terminal device 1108 are mainly included. The base stations 1104 and 1106 form a CoMP coordinating set of the terminal device 1108, and both the base stations 1104 and 1106 are connected to the macro base station 1102. Each UE has dual connectivity. A control plane is separated from a data plane. The base stations 1104 and 1106 are responsible for the data plane. The macro base station 1102 is responsible for the control plane, obtains a measurement report, and instructs beam switching. In an $n^{th}$ subframe, when the terminal device 1108 needs to be handed over from the base station 1104 to the base station 1106 due to a movement or a rotation and beam blocking, the macro base station 1102 indicates, by sending a DCI message, an optimal transmit beam index to which the terminal device 1108 switches. The terminal device 1108 switches to a corresponding optimal transmit beam in an $(n+k)^{th}$ subframe. Therefore, an optimal transmit and receive beam pair is determined by the macro base station 1102.

Figure 12:
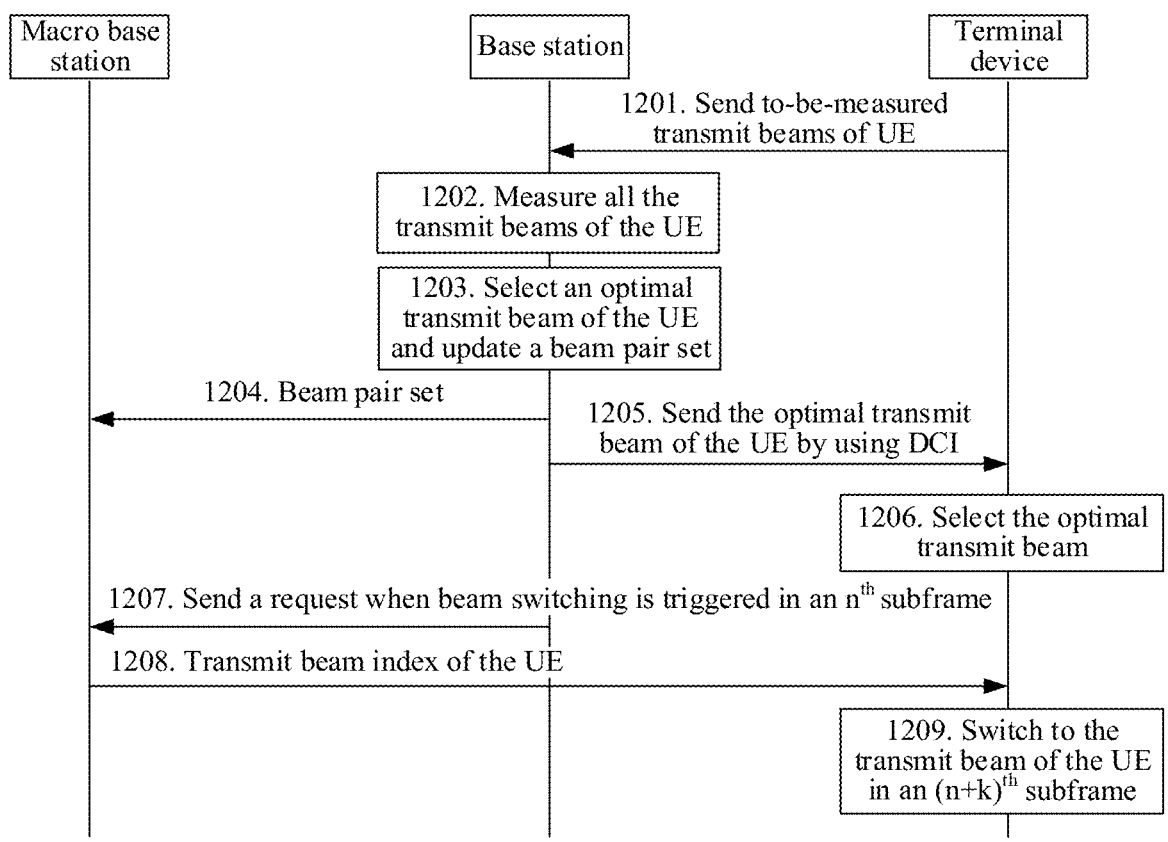
FIG. 12 is a schematic interaction diagram of a method for a beam switching process in an uplink dependent network system according to another embodiment of this application.

FIG. 12 is a schematic interaction diagram of a method for a beam switching process in an uplink dependent network system according to an embodiment of this application. As shown in FIG. 12, the method includes the following steps:

1201 to 1207 are basically the same as 1001 to 1007, and a difference is that the base station controller is replaced with a macro base station.

1208. The macro base station directly sends an optimal transmit beam index to the terminal device by using DCI based on current information.

1209. After receiving the optimal transmit beam index received from the macro base station, the terminal device switches the beams in an $(n+k)^{th}$ subframe based on k that is semi-statically or dynamically configured before.

Figure 13:
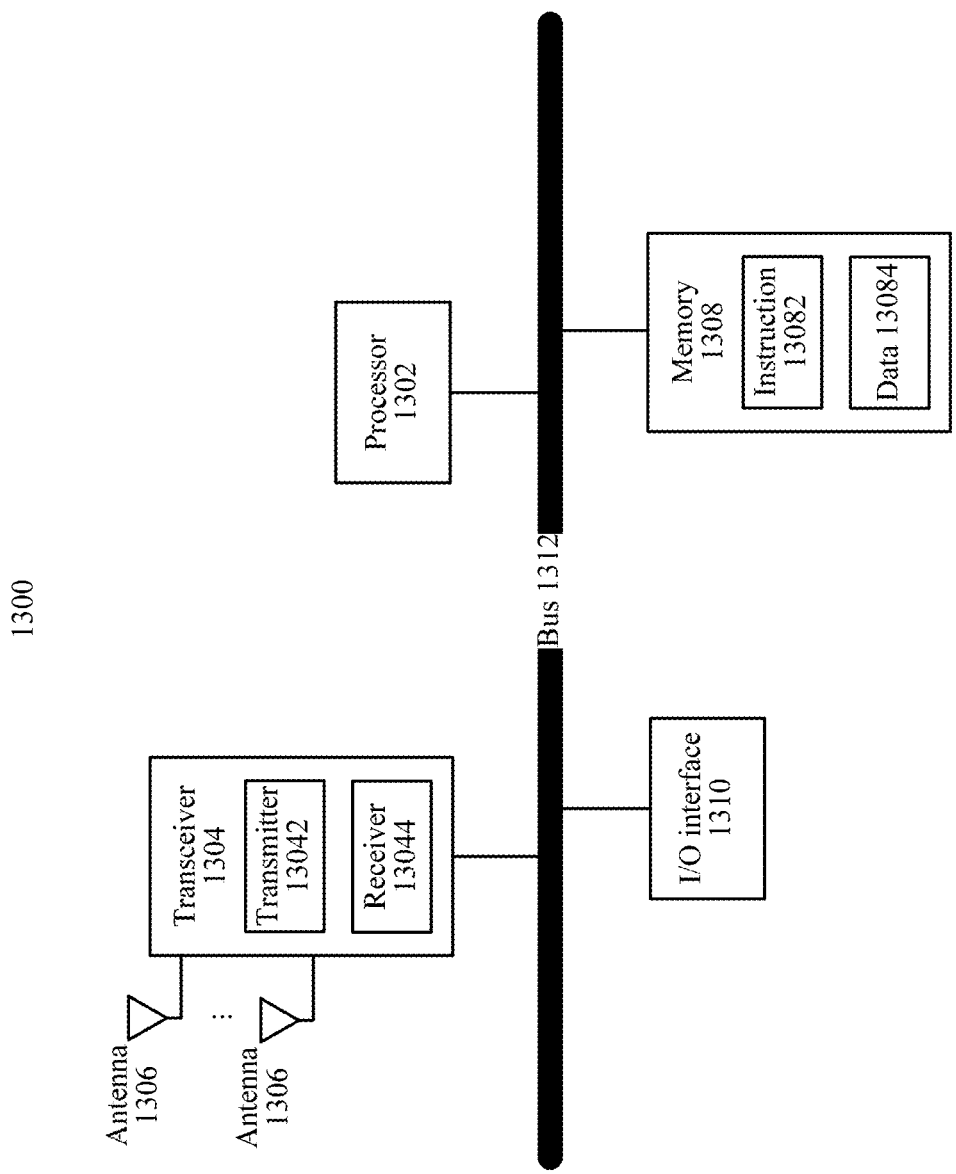
FIG. 13 is a schematic diagram of a hardware structure of a terminal device according to an embodiment of this application.

FIG. 13 is a schematic diagram of a hardware structure of a terminal device 1300 according to an embodiment of this application. As shown in FIG. 13, the terminal device 1300 includes a processor 1302, a transceiver 1304, a plurality of antennas 1306, a memory 13015, and an input/output (Input/Output, I/O) interface 1310. The transceiver 1304 further includes a transmitter 13042 and a receiver 13044. The memory 13015 is further configured to store an instruction 13082 and data 13084. In addition, the terminal device 1300 may further include a bus 1312. The processor 1302, the transceiver 1304, the memory 13015, and the I/O interface 1310 communicate with and are connected to each other by using the bus 1312, and the plurality of antennas 1306 are connected to the transceiver 1304.

The processor 1302 may be a general-purpose processor, for example but not limited to a central processing unit (Central Processing Unit, CPU), or may be a special-purpose processor, for example but not limited to a digital signal processor (Digital Signal Processor, DSP), an application-specific integrated circuit (Application-Specific Integrated Circuit, ASIC), or a field programmable gate array (Field Programmable Gate Array, FPGA). In addition, the processor 1502 may further be a combination of a plurality of processors. The processor 1302 may be a processor that is specifically designed for performing the foregoing operations and/or steps, or may perform the foregoing operations and/or steps by reading and executing the instruction 13082 stored in the memory 13015. The processor 1302 possibly needs to use the data 15084 in a process of performing the foregoing operations and/or steps.

The transceiver 1304 includes the transmitter 13042 and the receiver 13044. The transmitter 13042 is configured to send an uplink signal to a base station by using at least one antenna of the plurality of antennas 1306. The receiver 13044 is configured to receive a downlink signal from the base station by using at least one antenna of the plurality of antennas 1306. The transmitter 13042 is specifically configured to send a signal by using at least one antenna of the plurality of antennas 1306.

The memory 13015 may be storage media of various types, such as a random access memory (Random Access Memory, RAM), a read-only memory (Read-Only Memory, ROM), a non-volatile random access memory (Non-Volatile Random Access Memory, NVRAM), a programmable read-only memory (Programmable Read-Only Memory, PROM), an erasable programmable read-only memory (Erasable Programmable Read-Only Memory, EPROM), an electrically erasable PROM (Electrically Erasable PROM, EEPROM), a flash memory, an optical memory, or a register. The memory 13015 is specifically configured to store the instruction 13082 and the data 13084. The processor 1302 performs the operations and/or steps described above by reading and executing the instruction 13082 stored in the memory 13015. The data 13084 possibly needs to be used in a process of performing the foregoing operations and/or steps.

The I/O interface 1310 is configured to receive an instruction and/or data from a peripheral device, and output an instruction and/or data to the peripheral device.

It should be noted that in a specific implementation process, the terminal device 1300 may further include other hardware components, and the components are not listed in this application.

Figure 14:
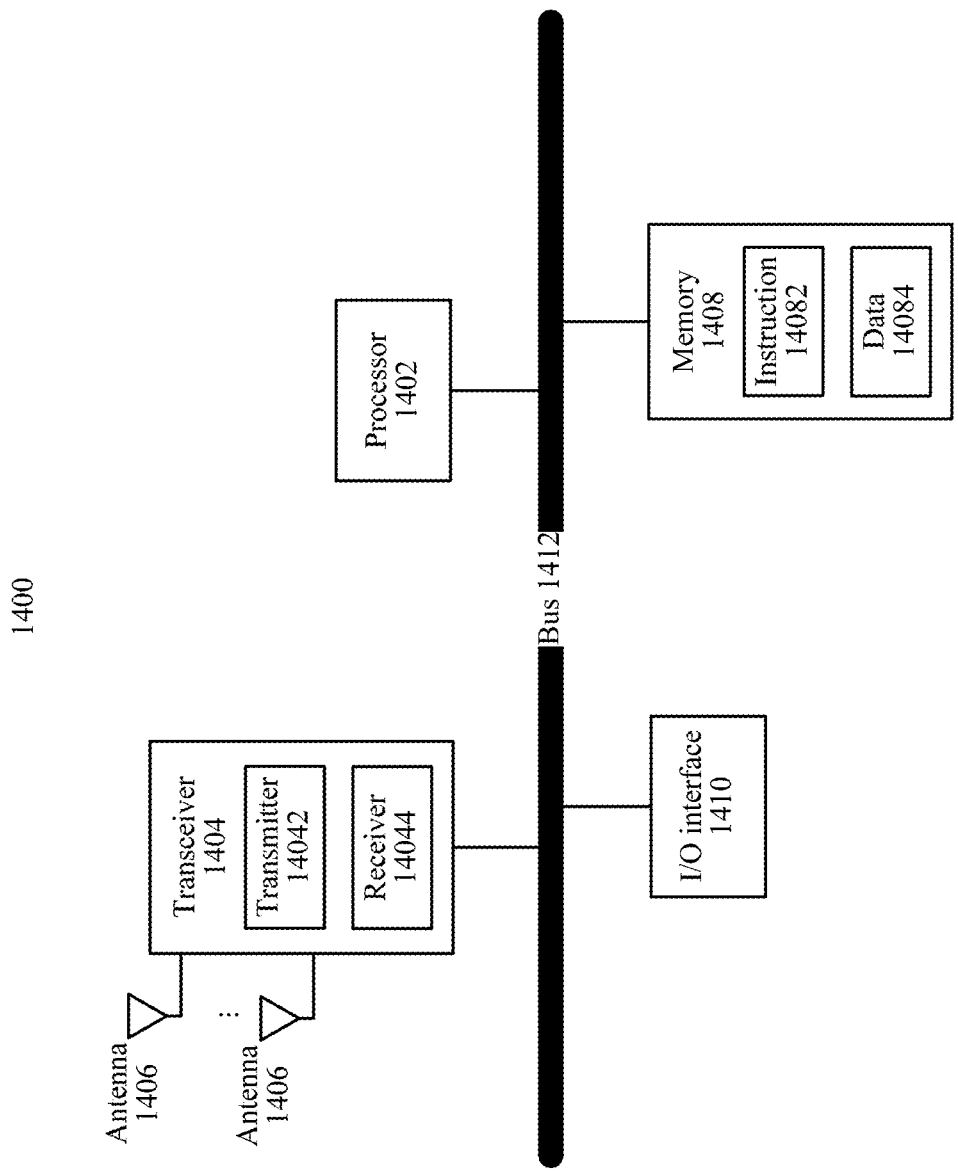
FIG. 14 is a schematic diagram of a hardware structure of a base station according to an embodiment of this application.

FIG. 14 is a schematic diagram of a hardware structure of a base station 1400 according to an embodiment of this application. As shown in FIG. 14, the base station 1400 includes a processor 1402, a transceiver 1404, a plurality of antennas 1406, a memory 1408, an I/O interface 1410, and a bus 1412. The transceiver 1404 further includes a transmitter 14042 and a receiver 14044. The memory 1408 is further configured to store an instruction 14082 and data 14084. In addition, the processor 1402, the transceiver 1404, the memory 1408, and the I/O interface 1410 communicate with and are connected to each other by using the bus 1412, and the plurality of antennas 1406 are connected to the transceiver 1404.

The processor 1402 may be a general-purpose processor, for example but not limited to a CPU, or may be a special-purpose processor, for example but not limited to a DSP, an ASIC, or an FPGA. In addition, the processor 1402 may alternatively be a combination of a plurality of processors.

The transceiver 1404 includes the transmitter 14042 and the receiver 14044. The transmitter 14042 is configured to send a downlink signal to a terminal device by using at least one antenna of the plurality of antennas 1406. The receiver 14044 is configured to receive an uplink signal from the terminal device by using at least one antenna of the plurality of antennas 1406. The transmitter 14042 is specifically configured to send a signal by using at least one antenna of the plurality of antennas 1406.

The memory 1408 may be storage media of various types, such as a RAM, a ROM, an NVRAM, a PROM, an EPROM, an EEPROM, a flash memory, an optical memory, or a register. The memory 1408 is specifically configured to store the instruction 14082 and the data 14084. The processor 1402 performs the operations and/or steps described above by reading and executing the instruction 14082 stored in the memory 1408. The data 14084 possibly needs to be used in a process of performing the foregoing operations and/or steps.

The I/O interface 1410 is configured to receive an instruction and/or data from a peripheral device, and output an instruction and/or data to the peripheral device.

It should be noted that in a specific implementation process, the base station 1400 may further include other hardware components, and the components are not listed in this application.

The coordinated multi-point-based beam configuration and management scheme provided in the present invention can be used in combination with a plurality of CoMP technologies, so that fast beam switching and alignment between base stations can be effectively implemented, and dynamic base station selection is supported, thereby improving link reliability.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter-base station beam configuration and management method based on a coordinated multi-point technology, comprising:
    receiving, by a base station, a beam signal sent by a terminal device;
    receiving, by the base station, a reference signal from the terminal device for beam measurement;
    determining, by the base station, a measurement value of the beam signal based on the reference signal;
    determining, by the base station, an optimal transmit beam of the terminal device and an optimal receive beam of the base station based at least on the measurement value of the beam signal;
    updating, by the base station, a beam pair set maintained by the base station based on the optimal transmit beam of the terminal device and the optimal receive beam of the base station, wherein the beam pair set comprises a transmit beam index of the terminal device and a receive beam index of the base station; and
    sending, by the base station, an optimal transmit beam index of the terminal device to the terminal device.

2. The method of claim 1, wherein the reference signal comprises a sounding reference signal (SRS), a demodulation reference signal (DMRS), or a new reference signal specified for the beam measurement.

3. The method of claim 1, wherein the transmit beam index of the terminal device comprises a beam identification index or a reference signal resource index.

4. The method of claim 1, wherein sending, by the base station, the optimal transmit beam index of the terminal device to the terminal device comprises:
    sending, by the base station, the optimal transmit beam index of the terminal device to the terminal device using downlink control information (DCI).

5. A base station, comprising:
    at least one processor; and
    a non-transitory computer-readable storage medium coupled to the at least one processor and storing programming instructions for execution by the at least one processor, the programming instructions instruct the at least one processor to perform operations comprising:
    receiving a beam signal sent by a terminal device;
    receiving a reference signal from the terminal device for beam measurement;
    determining a measurement value of the beam signal based on the reference signal;
    determining an optimal transmit beam of the terminal device and an optimal receive beam of the base station based at least on the measurement value of the beam signal;
    updating a beam pair set maintained by the base station based on the optimal transmit beam of the terminal device and the optimal receive beam of the base station, wherein the beam pair set comprises a transmit beam index of the terminal device and a receive beam index of the base station; and
    sending an optimal transmit beam index of the terminal device to the terminal device.

6. The base station of claim 5, wherein the reference signal comprises a sounding reference signal (SRS), a demodulation reference signal (DMRS), or a new reference signal specified for the beam measurement.

7. The base station of claim 5, wherein the transmit beam index of the terminal device comprises a beam identification index or a reference signal resource index.

8. The base station of claim 5, wherein sending the optimal transmit beam index of the terminal device to the terminal device comprises:
    sending the optimal transmit beam index of the terminal device to the terminal device using downlink control information (DCI).

9. A non-transitory computer readable storage medium, wherein the computer readable storage medium stores instructions executable by at least one processor, wherein the instructions instruct the at least one processor to perform operations comprising:
    receiving, by a base station, a beam signal sent by a terminal device;
    receiving, by the base station, a reference signal from the terminal device for beam measurement;
    determining, by the base station, a measurement value of the beam signal based on the reference signal;
    determining, by the base station, an optimal transmit beam of the terminal device and an optimal receive beam of the base station based at least on the measurement value of the beam signal;
    updating, by the base station, a beam pair set maintained by the base station based on the optimal transmit beam of the terminal device and the optimal receive beam of the base station, wherein the beam pair set comprises a transmit beam index of the terminal device and a receive beam index of the base station; and
    sending, by the base station, an optimal transmit beam index of the terminal device to the terminal device.

10. The non-transitory computer readable storage medium of claim 9, wherein the reference signal comprises a sounding reference signal (SRS), a demodulation reference signal (DMRS), or a new reference signal specified for the beam measurement.

11. The non-transitory computer readable storage medium of claim 9, wherein the transmit beam index of the terminal device comprises a beam identification index or a reference signal resource index.

12. The non-transitory computer readable storage medium of claim 9, wherein sending, by the base station, the optimal transmit beam index of the terminal device to the terminal device comprises:
    sending, by the base station, the optimal transmit beam index of the terminal device to the terminal device using downlink control information (DCI).

* * * * *